United States Patent
Kim et al.

(10) Patent No.: US 8,861,946 B2
(45) Date of Patent: Oct. 14, 2014

(54) DEVICE FOR DRIVING CAMERA LENS MODULE IN PORTABLE TERMINAL

(71) Applicant: Jahwa Electronics Co., Ltd., Chungcheonbuk-do (KR)

(72) Inventors: Hee Seung Kim, Seoul (KR); In Soo Kim, Seoul (KR); Il Gyu Kang, Cheongju-si (KR)

(73) Assignee: Jahwa Electronics Co., Ltd., Cheongwon (KR)

( * ) Notice: Subject to any disclaimer, the term of this patent is extended or adjusted under 35 U.S.C. 154(b) by 0 days.

(21) Appl. No.: 14/191,552

(22) Filed: Feb. 27, 2014

(65) Prior Publication Data

US 2014/0255016 A1    Sep. 11, 2014

(30) Foreign Application Priority Data

Mar. 7, 2013  (KR) .................... 10-2013-0024600
Mar. 29, 2013 (KR) .................... 10-2013-0034755

(51) Int. Cl.
*G03B 17/00* (2006.01)
*G02B 27/64* (2006.01)

(52) U.S. Cl.
CPC .................. *G02B 27/646* (2013.01)
USPC ........................................... 396/55

(58) Field of Classification Search
USPC ................... 396/55; 348/208.11; 359/557
See application file for complete search history.

(56) References Cited

U.S. PATENT DOCUMENTS

| 7,747,149 B2* | 6/2010 | Tomita ............................ 396/55 |
| 2011/0052164 A1* | 3/2011 | Huang et al. .................... 396/55 |
| 2012/0224841 A1* | 9/2012 | Wu et al. ......................... 396/55 |
| 2014/0009631 A1* | 1/2014 | Topliss ..................... 348/208.11 |

FOREIGN PATENT DOCUMENTS

| JP | 2002-229090 A | 8/2002 |
| JP | 2005-331706 A | 12/2005 |
| JP | 2008-139893 A | 6/2008 |
| JP | 2011-065140 A | 3/2011 |
| KR | 10-2011-0025512 A | 3/2011 |
| KR | 10-2012-0045333 A | 5/2012 |
| KR | 10-1204587 B1 | 11/2012 |

OTHER PUBLICATIONS

KIPO Office action for Korean Patent Application No. 10-2013-0034755 which corresponds to the above-identified application.
International Search Report for PCT Application No. PCT/KR2014/001619.
Written Opinion for PCT Application No. PCT/KR2014/001619.

* cited by examiner

*Primary Examiner* — W B Perkey
(74) *Attorney, Agent, or Firm* — Edwards Wildman Palmer LLP; Kongsik Kim

(57) ABSTRACT

A camera lens module of a portable terminal includes: an external case; an Optical Image Stabilizer (OIS) carrier disposed within the external case; and at least one OIS driver disposed in at least one of corner regions of the external case to correct a hand shaking state of the OIS carrier.

17 Claims, 13 Drawing Sheets

DEVICE FOR DRIVING CAMERA LENS MODULE IN PORTABLE TERMINAL

PRIORITY

This application claims the priority under 35 U.S.C. §119(a) to Korean Application Serial Nos. 10-2013-0024600 and 10-2013-0034755, which were filed in the Korean Intellectual Property Office on Mar. 7, 2013 and Mar. 29, 2013, the entire content of which is hereby incorporated by reference.

BACKGROUND OF THE INVENTION

1. Field of the Invention

The present invention relates to a portable terminal, and more particularly to a device for driving a camera lens module in a portable terminal, which is advantageous for miniaturization thereof.

2. Description of the Related Art

Recently, with the development of mobile communication technologies, a popularized portable terminal such as a smart phone has employed at least one camera lens module which is miniaturized and light therein.

Particularly, with respect to a camera lens module employed in the portable terminal, users have required a high capacitance and performance camera lens module. Accordingly, a camera lens module has been developed which corresponds to a class of Digital Single Lens Reflex (DSLR) camera. Furthermore, it has become a trend that the camera lens module is developed toward an advantageous direction for miniaturization and lightening with the maintenance of a high performance and a high capacity.

The camera lens module employed to the portable terminal has an Auto-Focusing (AF) function, a zoom-in and zoom-out function, and so on, and also has a stabilizer of compensating for a hand shaking, which makes a camera perform its functions. The camera lens module generally includes a lens system, a lens driving unit for enabling the lens system to move along a direction of an optical axis and making the lens system perform focusing, and an image sensor for picking up light incident through the lens system and converting the light into image signals.

Examples of the conventional camera lens module mounted on the portable terminal are disclosed in Korean Patent Application Nos. 2010-106811 and 2009-83613.

However, since there is a trend that the portable terminal is gradually miniaturized with the maintenance of the high quality, a camera lens module mounted on the portable terminal also is required to be miniaturized with the maintenance of the high performance.

SUMMARY OF THE INVENTION

The present invention has been made to solve the above mentioned problems in the prior art, and an aspect of the present invention is to provide a device for driving a camera lens module of a portable terminal.

Further, another aspect of the present invention is to provide a device for driving a camera lens module of a portable terminal, in which Optical Image Stabilizer (OIS) driving units are disposed in empty spaces at both corners of an external case to face a lens and which contributes to miniaturization of the camera lens module.

In accordance with an aspect of the present invention, a camera lens module of a portable terminal includes: an external case; an Optical Image Stabilizer (OIS) carrier disposed within the external case; and at least one OIS driver disposed in at least one of corner regions of the external case to correct a hand shaking state of the OIS carrier.

In accordance with another aspect of the present invention, a camera lens module of a portable terminal includes: an external case; a lens carrier guided along an optical axis within the external case; an Automatic Focusing (AF) driver disposed between one surface of the external case and one side of the lens carrier facing the one surface to move the lens carrier along the optical axis; an Optical Image Stabilizer (OIS) carrier that houses the lens carrier; and first and second OIS drivers perpendicularly disposed in an optical axis direction in first and second corner regions, respectively, of the opposite side of one surface in which the AF driver is disposed.

In accordance with still another aspect of the present invention, a camera lens module of a portable terminal includes: an external case; a lens carrier guided along an optical axis within the external case; an Automatic Focusing (AF) driver disposed between one surface of the external case and one side of the lens carrier facing the one surface to move the lens carrier along the optical axis; an Optical Image Stabilizer (OIS) carrier that houses the lens carrier; and OIS drivers disposed in at least two corner regions, respectively of the opposite side of the one surface among corner regions provided in the external case and each mounted in parallel to a vertical direction plane of the optical axis in the respective corner regions.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE PREFERRED EMBODIMENTS

The following description with reference to the accompanying drawings is provided to help a whole undemanding of embodiments of the present invention as defined by the claims and the equivalents of the claims. Although the description includes various specific details to help the understanding of the embodiment of the present invention, the details will be merely regarded as examples. Therefore, it will be understood by a person skilled in the art that variations and modifications of the embodiments described in the disclosure can be achieved without departing from the scope and spirit of the present invention. Further, the description of well-known functions and structures will be omitted for definition and simplicity.

Hereinafter, a structure of a camera lens module 10 according to the present invention will be described with reference to the accompanying drawings.

Figure 1:
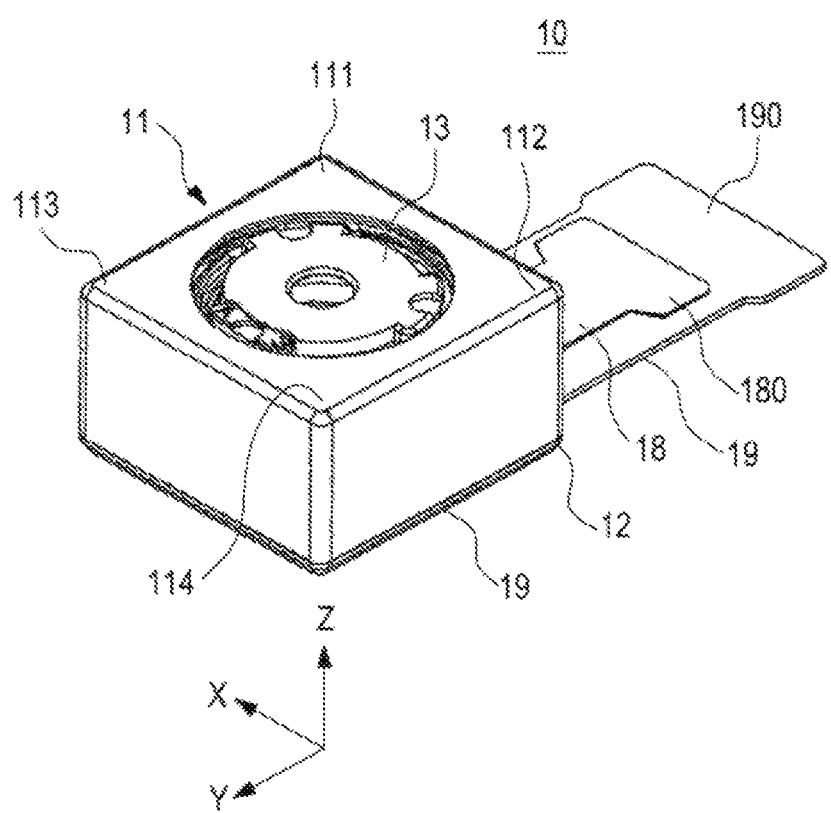
FIG. 1 is a perspective view illustrating an appearance of a camera lens module employing a driving device according to a first embodiment of the present invention.

FIG. 1 is a perspective view illustrating an appearance of the camera lens module 10 according to the present invention. In FIG. 1, since only the appearance of the camera lens module 10 is shown, an external case 11 and 19 of the camera lens module 10, first and second circuit boards and an upper end of a lens barrel 13 are only shown. The camera lens module 10 is employed to the portable terminal. The portable terminal on which the camera lens module 10 according to the present invention is mounted is merely a general term, and the present invention may be applied to any one of a mobile phone, a palm sized Personal Computer (PC), a Personal Communication System (PCS), a Personal Digital Assistant (PDA), a Hand-held PC (HPC), a smart phone, a wireless Local Area Network (LAN) terminal, a laptop computer, a netbook, a tablet PC and the like. Therefore, a term "portable terminal" should not be used to limit that the present invention is applied to a specific type device.

In FIGS. 1 to 7, a three-dimensional coordinate of X, Y and Z is shown in which an axis of Z is a longitudinal direction of the camera lens module 10 and means an optical axis along which a lens barrel 13 moves, an axis of X means a horizontal direction (a direction which is at right angles with the optical axis) of the camera lens module 10, and an axis of Y means a vertical direction (a direction which is at right angles with the optical axis and the axis of X) of the camera lens module 10. An Automatic Focusing (AF) unit described later provides a lens carrier 14 (sec FIGS. 2 and 3) with a force so that the lens carrier 14 moves along the optical axis, and an Optical Image Stabilizer (OIS) driving unit provides an OIS carrier 15 (see FIGS. 2 and 3) with a force so that the OIS carrier 15 compensates a horizontal balance in directions of X and Y around the optical axis.

A device for driving the camera lens module 10 (hereinafter, referred to as a "module") according to the present invention will be described in detail with reference to FIGS. 2 to 7. It is noted that the module 10 described below is miniaturized by defining a mounting space for driving units (first and second OIS driving units described later) which significantly occupy an internal mounting space in the module, to two corners among corner regions 111, 112, 113 and 114. Generally, the lens barrel 13 has a cylindrical shape, and the external case 11 and 19 has a polyhedral shape, particularly, a rectangular parallelepiped shape or a regular hexahedron shape. If the lens barrel 13 is received in the external case 11 and 19, the external case 11 and 19 has empty spaces at four corner regions 111, 112, 113 and 114 in which the driving units are arranged. Accordingly, the miniaturization of the camera lens module 10 can be achieved. In the present invention, a pair of OIS driving units is disposed at two corner regions, i.e. first and second corner regions 111 and 112, among four empty spaces. Hereinafter, an embodiment of the module which is miniaturized will be described.

The module 10 has the external appearance which is a schematically rectangular parallelepiped shape, and includes a lens system, a guide unit, the AF driving unit, first and second OIS driving units and at least one circuit board, which are received in an internal receiving space defined by the external case 11 and 19.

The external case 11 and 19 has a polyhedral shape, particularly a roughly rectangular parallelepiped shape, in which upper and lower surfaces have a regular tetragon shape and four lateral surfaces have an approximately rectangular shape. The external case 11 and 19 functions as a housing which receives other parts and protects the received parts from an exterior. Two circuit boards 18 and 19 extend from the external case 11 and 19 to be in electrical contact with an external electric power source (not shown). One circuit board 18 extends from an OIS circuit board, and the other circuit board 19 is an image sensor circuit board. The OIS circuit board 18 and the image sensor circuit board 19 have connection terminals 180 and 190 at end portions thereof, respectively.

The external case includes an upper case 11 and the image sensor circuit board 19 which are combined with each other, and has the four corner regions 111, 112, 113 and 114.

According to the embodiment of the present invention, there is no necessity of limiting the external case 11 and 19 to the rectangular parallelepiped shape. The external case 11 and 19 may be configured to have the regular hexahedral shape and also may have a polyhedral shape with a pentagonal or hexagonal cross-section.

The lens system includes the lens barrel 13 having a lens (not shown) and the lens carrier 14 which is received in the lens barrel 13 and moves together with the lens barrel 13 along the optical axis. The lens barrel 13 has a cylinder shape, and is moved along the optical axis by means of the AF driving unit in a state of being fully received in the lens carrier 14, so as to focus the lens. The lens carrier 14 fully receives the lens barrel 13 therein, and has a magnet mounting groove of a rectangular shape on an outer peripheral surface thereof. The lens carrier 14 is guided by means of a pair of guide devices along the optical axis. The pair of guide devices includes well-known guide units g1 and g2, and ball bearings b1 and b2. The lens barrel 13 may be detachably coupled to the lens carrier, or constituted of a one-piece structure.

The device for driving the module 10 according to the present invention includes at least one AF driving unit and at least one OIS driving unit. In the present invention, a single AF driving unit is described as an example of the AF driving unit. Further, at least two OIS driving units are arranged on a surface opposite to that at which the AF driving unit is positioned, and spaced apart from each other around the optical axis. In the present invention, although it is described as an example that the OIS driving unit includes first and second OIS driving units which are disposed at first and second corner regions respectively, the disposed positions of the first and second OIS driving units are not limited to the corner regions, and may be changed if the first and second OIS driving units can be disposed in empty spaces in the module.

Firstly, a structure of the OIS driving unit will be described. The OIS driving units are disposed in at least two corner regions among the corner regions in the external case, respectively, and compensate for a hand shaking of the OIS carrier.

Hereinafter, the first and second OIS driving units which are disposed in the first and second corner regions will be described as an example. The first and second OIS driving units are arranged at both corners, i.e. the first and second corner regions, on a surface opposite to that on which the AF driving unit is disposed, around the optical axis. In other words, the first and second OIS driving units are disposed in the first and second corner regions 111 and 112 respectively to be opposite to each other, and compensate a balance of the OIS carrier 15 along the optical axis using a resultant of electromagnetic forces generated thereby. The first and second OIS driving units are symmetrically disposed in the first and second corner regions 111 and 112 around the lens barrel 13 respectively, so as to face to a center of the lens barrel 13.

The first OIS driving unit includes a first OIS magnet m2 which is mounted on an outer peripheral surface of the OIS carrier 15 and faces to the first corner region 111, a first OIS coil c2 which is disposed in the first corner region 111 and is spaced apart from and faces to the first OIS magnet m2, and a first positioning sensor h2 which is disposed behind a back surface of the first OIS coil c2 in the first corner region 111. It may be assumed that the first corner region 111 approximately has a polyhedral shape with a cross section of a triangle shape. As electric current is applied to the first OIS coil c2, the first OIS magnet m2 and the first OIS coil c2 generate electromagnetic force. The first positioning sensor h2 includes a hall sensor.

The second OIS driving unit includes a second OIS magnet m3 which is mounted on an outer peripheral surface of the OIS carrier 15 and faces to the second corner region 112, a second OIS coil c3 which is disposed in the second corner region 112 and is spaced apart from while facing to the second OIS magnet m3, and a second positioning sensor h3 which is disposed behind a back surface of the second OIS coil c3 in the second corner region 112. It may be assumed that the second corner region 112 approximately has a polyhedral shape with a cross section of a triangle shape. As electric current is applied to the second OIS coil c3, the second OIS magnet m3 and the second OIS coil c3 generate electromagnetic force. The second positioning sensor h3 includes a hall sensor.

Accordingly, the OIS carrier 15 can be compensated for a balance around axes of X and Y by means of a resultant of forces generated by the first and second OIS magnets m2 and m3 and the first and second OIS coils c2 and c3.

The first hall sensor h2 is disposed at an outermost of the first corner regions 111, and directly faces to the first OIS magnet m2 through a first opening in the first OIS coil c2. Further, the second hall sensor h3 is disposed at an outermost of the second corner regions 112, and directly faces to the second OIS magnet m3 through a second opening in the second OIS coil c3.

The OIS carrier 15 is supported by the OIS base 16 positioned at the bottom. The OIS carrier has four corners in an upper end portion and at each corner thereof, a cutout portion is provided to pass through each suspension wire to be described later. That is, the OIS carrier 15 is positioned to maintain a levitation state somewhat separated from the OIS base by the suspension wire on the OIS base 16 positioned at the bottom.

The OIS base 16 is formed in a plate-shaped square and has four corners, and first and second upright portions 160 and 162 are provided at two corner regions, respectively to be housed in the first and second corner regions 111 and 112, respectively. The first and second upright portions 160 and 162 are formed in an approximately triangular pillar shape and support the first and second OIS coils c2 and c3 and the first and second hell sensors h2 and h3, respectively. The first and second upright portions 160 and 162 have third and four openings, respectively, and in the third and four openings, the first and second hall sensors h2 and h3, respectively, are housed and disposed. Further, the OIS base 16 close contacts with the sensor base 12 and is coupled to the sensor base 12 in an optical axis direction, and the OIS base 16 and the sensor base 12 are coupled by assembling a protrusion and a groove/hole.

The AF driving writ is disposed between one surface of the external case and an outer peripheral surface of the lens carrier which faces to the one surface of the external case, and makes the lens carrier move along the optical axis. The AF driving unit includes an AF magnet m1 which is mounted on the outer peripheral surface of the lens carrier 14 in parallel with the one surface of the external case, an AF coil c1 which is disposed to face to the AF magnet m1 disposed on the one surface of the external case, an AF positioning sensor h1 which is disposed in an opening of the AF coil c1, an AF driving IC which is disposed by the side of the AF coil c1, and an AF yoke y which is disposed to face to and support the AF coil c1. When electric current is applied to the AF coil c1, an electromagnetic force generated between the AF coil c1 and the AF magnet m1 makes the lens barrel 14 move along the optical axis so that a focal distance of the lens (not shown) can be automatically adjusted. The AF positioning sensor h1 includes a hall sensor. That is, the AF driving unit according to the present invention makes the lens carrier 14 move along the optical axis independently from the OIS carrier 15 because the AF coil c1 or the AF magnet m1 is exposed through the opening on the one surface OIS carrier 15 to face to the one surface of the external case 11 and 19 while the AF coil c1 or the AF magnet m1 is mounted on the one surface of the external case 11 and 19 to face to the AF coil c1 or the AF magnet m1. Therefore, the module according to the present invention is capable of performing an AF driving and an OIS driving with a minimum size and a minimum driving force.

The AF driving unit includes an AF circuit board 17 disposed at an upper end of the OIS carrier 15, and the first and second OIS driving units include an OIS circuit board 18 disposed on a bottom surface of the OIS base. The AF circuit board 17 and the OIS circuit board 18 are flexible circuit boards. The AF circuit board 17 and the OIS circuit board 18 are disposed in parallel at an upper end and a lower end of the OIS carrier 15 in a direction perpendicular to the optical axis, and are opposed to each other. Particularly, the AF circuit board 17 has a closed-loop shape and is continuously extended along an upper end portion of the OIS carrier 15. Further, the OIS flexible printed circuit board 18 has a closed-loop shape and is continuously extended along a lower end portion of the OIS carrier 15. Specifically, the OIS flexible printed circuit board 18 is continuously extended along a bottom surface of the OIS base 16.

The AF circuit board 17 and the OIS circuit board 18 generally have a regular tetragonal shape, and four corners, respectively. The AF circuit board 17 and the OIS circuit board 18 have suspension wires as described later, which are fixed to the four corners, respectively.

The AF flexible printed circuit board 17 is formed in a shape continuously extended along an upper end portion of the OIS carrier 15, and the OIS flexible printed circuit board 18 is formed in a shape continuously extended along the OIS base 16 that supports the OIS carrier 15 at the bottom. The AF flexible printed circuit board 17 is formed in a shape further including a first central opening 174 and an AF auxiliary flexible printed circuit board 170 bent orthogonal downward to be disposed to face the AF magnet m. In the AF auxiliary flexible printed circuit board 170, an AF coil c1 and an AF sensor h1 are disposed.

The OIS flexible printed circuit board 18 is formed in a shape further including a second central opening 184 and first and second AF auxiliary flexible printed circuit boards 180 and 182 bent orthogonal upward to be disposed to face first and second OIS magnets m2 and m3, respectively. In the first OIS auxiliary flexible printed circuit board 180, a first OIS coil c2 and a first OIS sensor h2 are disposed, and in the second OIS auxiliary flexible printed circuit board 182, a first OIS coil c3 and a second OIS sensor h3 are disposed. The first and second OIS auxiliary flexible printed circuit boards 180 and 182 are supported by the first and second upright portions 160 and 162, respectively to be housed in the first and second corner regions 111 and 112, respectively.

The first OIS auxiliary flexible printed circuit board 180 is bent by approximately 90° while having the first OIS coil c2 and the first OIS hall sensor h2 to be housed in the first corner region 111 while being supported by the first upright portion 160. Further, the second OIS auxiliary flexible printed circuit board 182 is bent by approximately 90° while having the second OIS coil c3 and the second OIS hall sensor h3 to be housed in the second corner region 112 while being supported by the second upright 162.

The AF circuit board 17 and the OIS circuit board 18 are electrically connected by means of at least one suspension wire w. That is, the suspension wire w performs a function of electrically connecting the AF flexible circuit board 17 with the OIS flexible circuit board 18, and supports the AF flexible circuit board 17 and the OIS flexible circuit board 18. Of course, the suspension wire w is a conductor with elasticity and is a linear type. Four suspension wires w are used, and are disposed to be upright at the four corner regions respectively. Each suspension wire w extends along the optical axis and has one end thereof fixed to the AF flexible circuit board 17 and the other end thereof fixed to the OIS flexible circuit board 18. To do this, the AF flexible circuit board 17 has soldering openings formed at the four corners thereof respectively, and the OIS flexible circuit board 18 has soldering openings formed at the four corners thereof respectively. Further, the OIS carrier 15 has openings at the four corner regions on the upper end thereof, through which the suspension wires w extend, and the first and second upright portions 160 and 162 are configured to receive two wires w respectively.

Preferably, two wires among the four suspension wires w are installed to be upright in the first and second corner regions 111 and 112. Accordingly, the two suspension wires w face to the first and second OIS coils c2 and c3 and the first and second OIS positioning sensors h2 and h3, respectively. Additionally, in the first and second corner regions 111 and 112, the two suspension wires w are disposed at the outermost rather than the first and second positioning sensors h2 and h3.

Figure 2A:
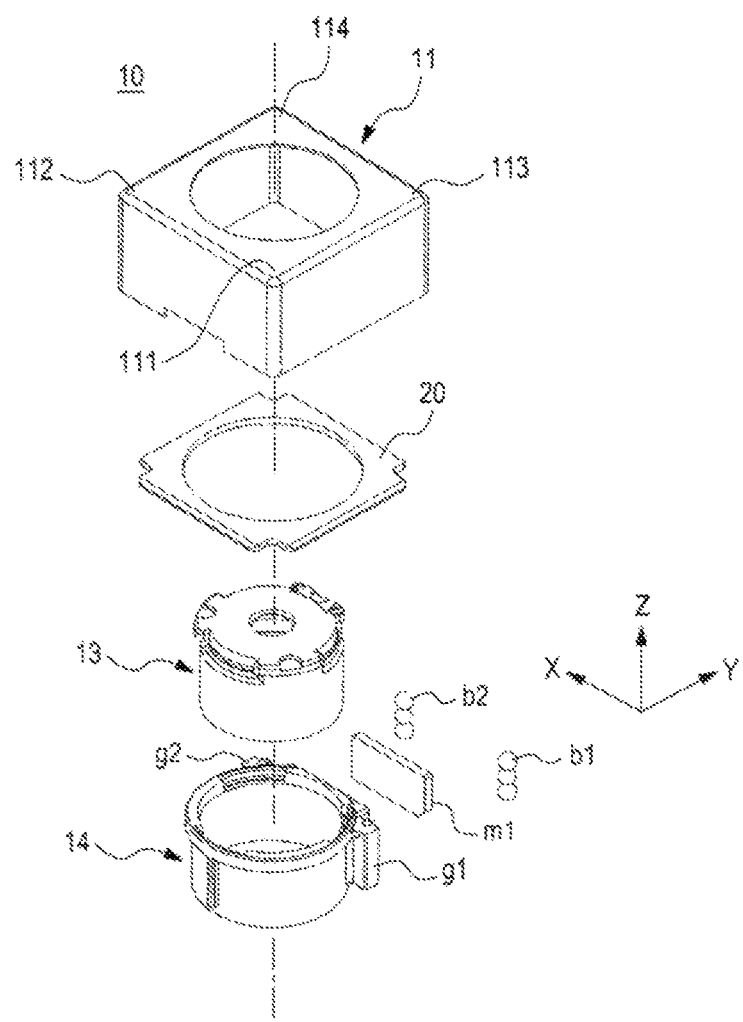
FIGS. 2A and 2B are exploded perspective views illustrating a structure of the camera lens module employing the driving device according to the first embodiment of the present invention, in which elements of the camera lens module are sequentially arranged along an optical axis.
Figure 2B:
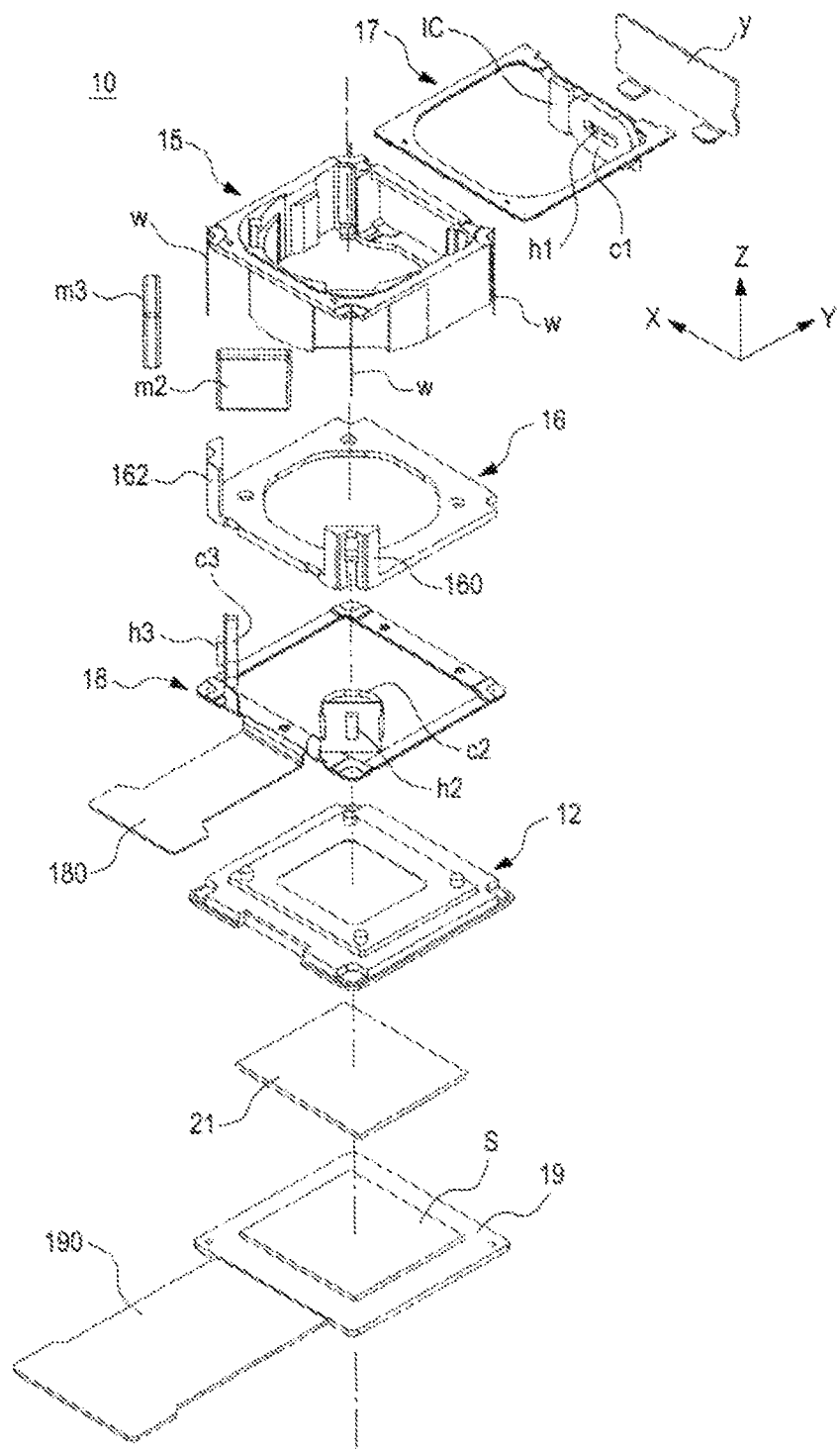
Figure 3A:
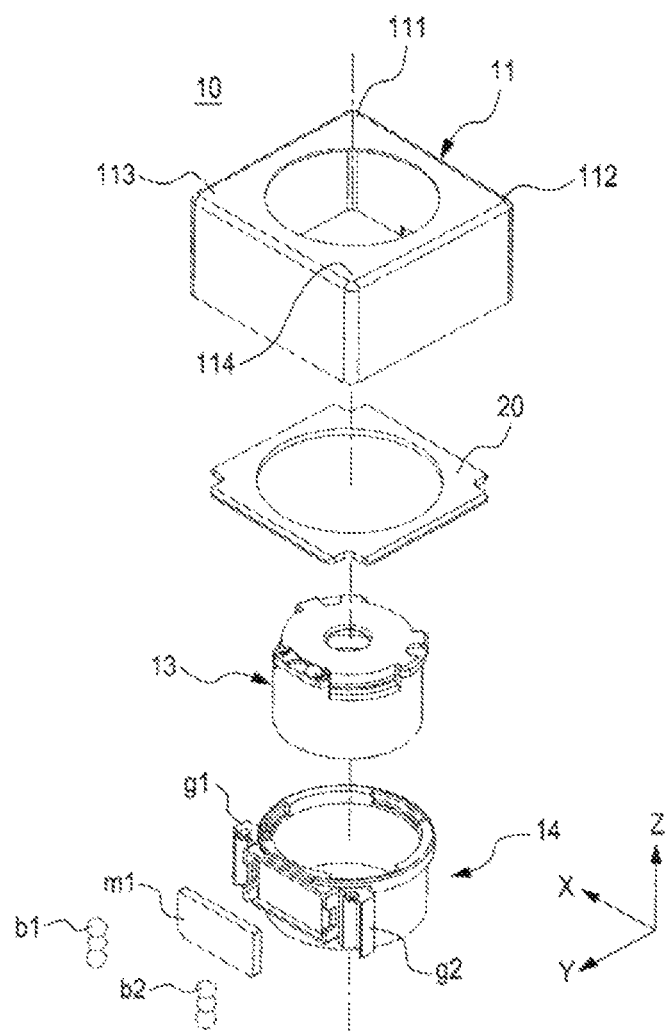
FIGS. 3A and 3B are exploded perspective views illustrating a structure of the camera lens module employing the driving device according to the first embodiment of the present invention, in which elements of the camera lens module are sequentially arranged along an optical axis.
Figure 3B:
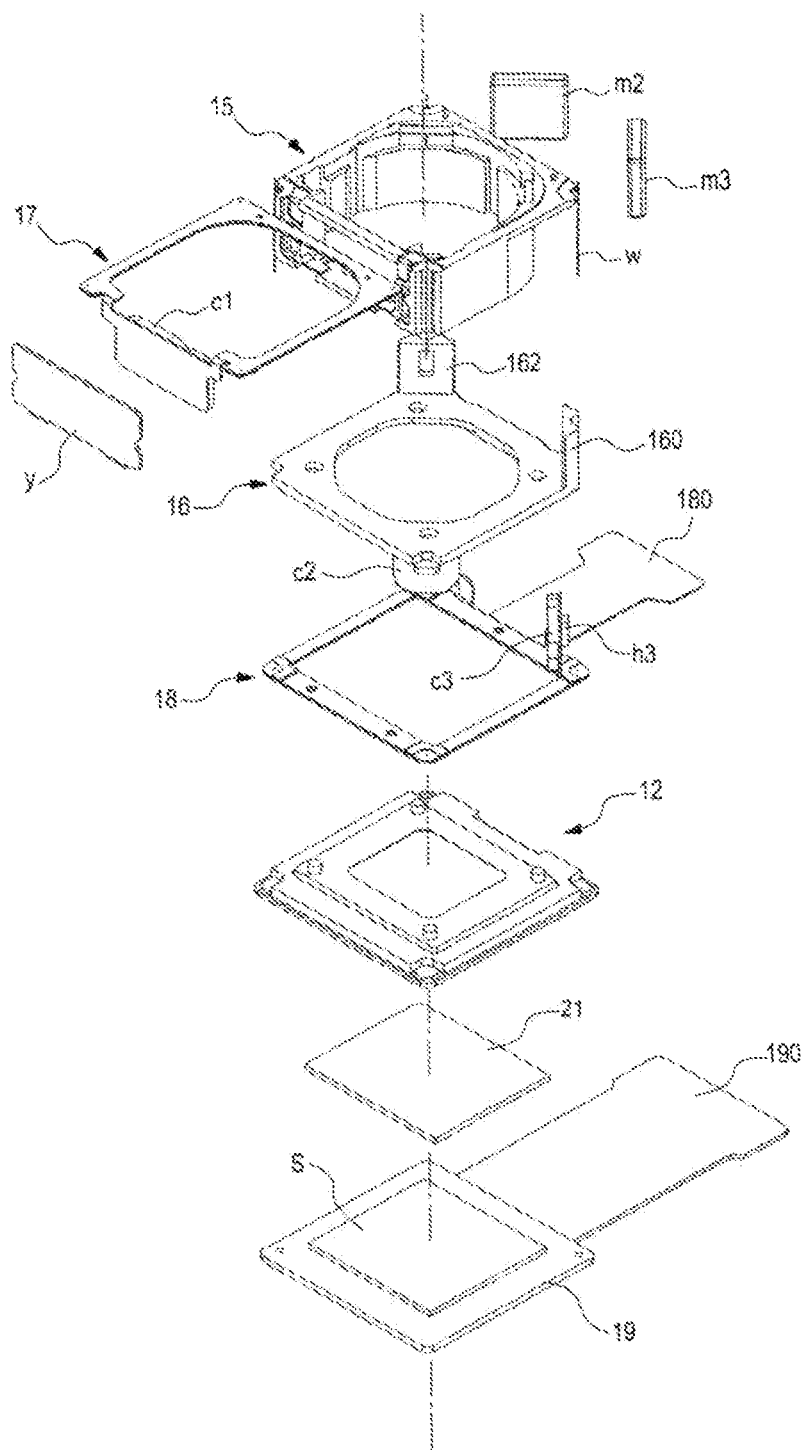
Figure 4:
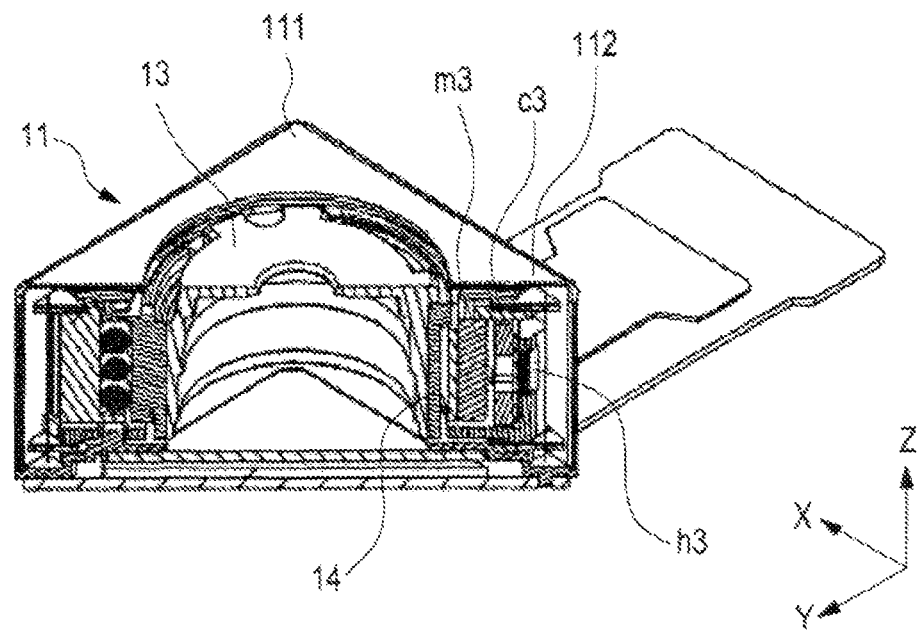
FIG. 4 is a perspective view illustrating the camera lens module employing the driving device according to the first embodiment of the present invention, in which the camera lens module is cut in a diagonal direction.
Figure 5:
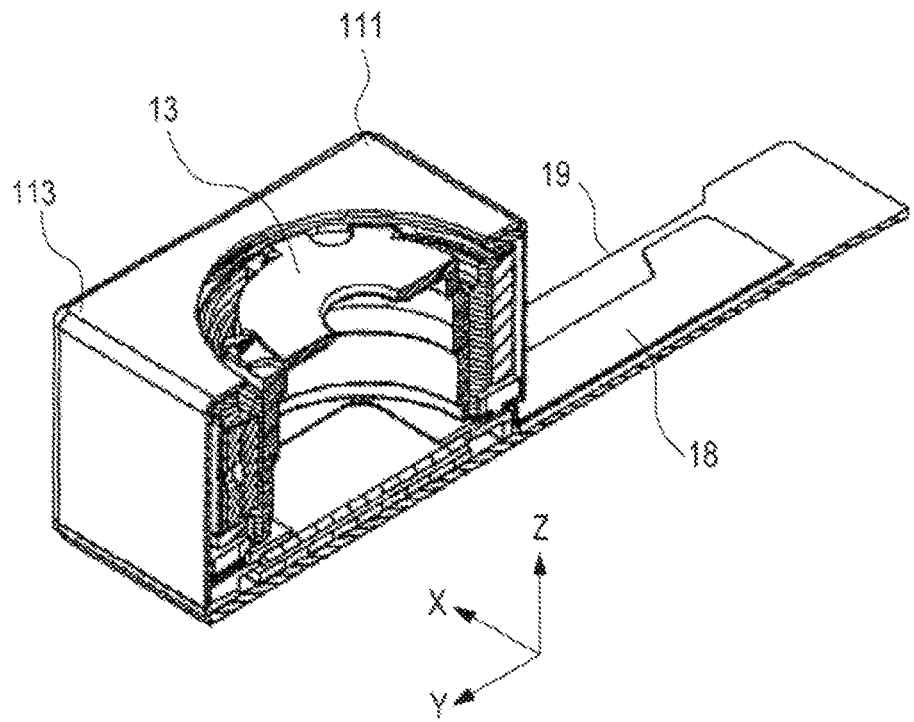
FIG. 5 is a perspective view illustrating the camera lens module employing the driving device according to the first embodiment of the present invention, in which the camera lens module is cut in a longitudinal direction.
Figure 6:
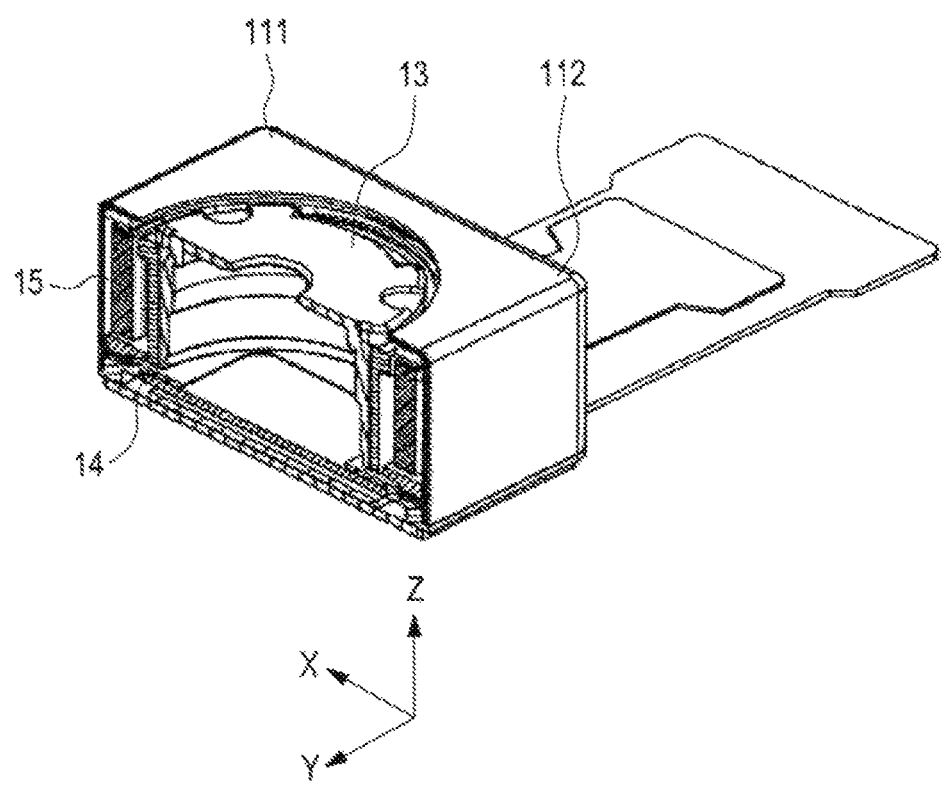
FIG. 6 is a perspective view illustrating the camera lens module employing the driving device according to the first embodiment of the present invention, in which the camera lens module is cut in a cross direction.
Figure 7:
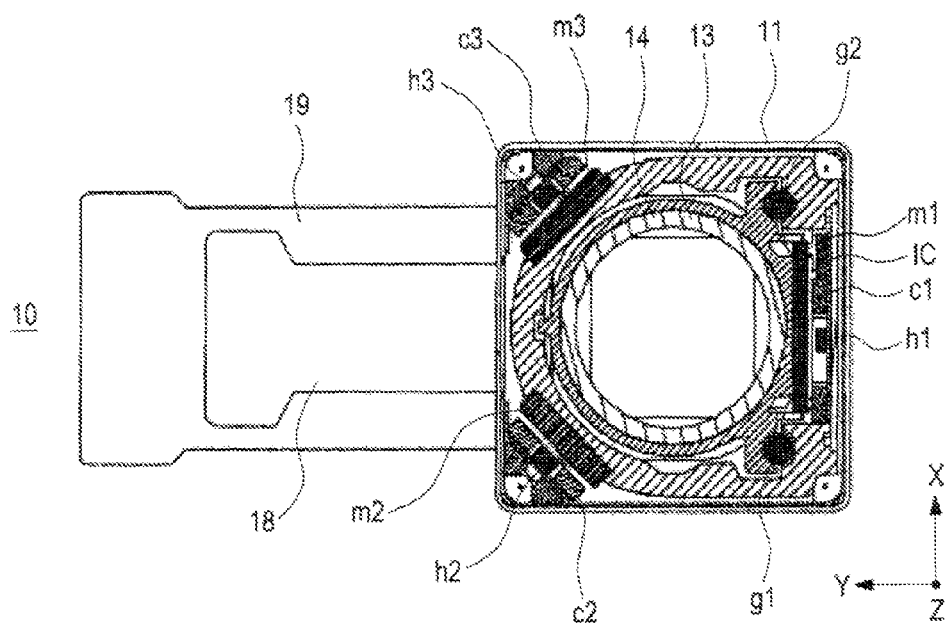
FIG. 7 is a cross sectional view illustrating the structure of the driving device according to the first embodiment of the present invention.

In FIG. 2, a reference numeral '20' indicates a spacer, a reference numeral '21' denotes an IR filter, and a reference character 'S' refers to an image sensor.

On the other hand, the first OIS magnet m2 and the first OIS coil c2 which constitute the first OIS driving unit may be changed in their arrangement positions, and the second OIS magnet m3 and the second OIS coil c3 which constitute the second OIS driving unit may be changed in their arrangement positions. In addition, it is not limited that the first and second positioning sensors are disposed in the openings of the first and second upright portions, and it is possible that the first and second positioning sensors are disposed near the coils on the OIS base.

In other words, the first OIS magnet m2 may be disposed in the first corner region 111, and the first OIS coil c2 may be positioned in the OIS carrier 15. Also, the first positioning sensor h2 may be disposed and operated in the OIS carrier 15. Additionally, the second OIS magnet m3 may be disposed in the second corner region 112, and the second OIS coil c3 may be positioned in the OIS carrier 15. Also, the second positioning sensor h3 may be disposed an operated in the OIS carrier 15.

In the present invention, moreover, the four suspension wires are employed in order to connect the AF flexible circuit board with the OIS flexible circuit board. However, it is possible to electrically connect the AF flexible circuit board with the OIS flexible circuit board by using a separate flexible circuit board instead of the suspension wires.

Further, the AF magnet and the AF coil which constitute the AF driving unit of the module may be replaced with a piezoelectric element.

Figure 8:
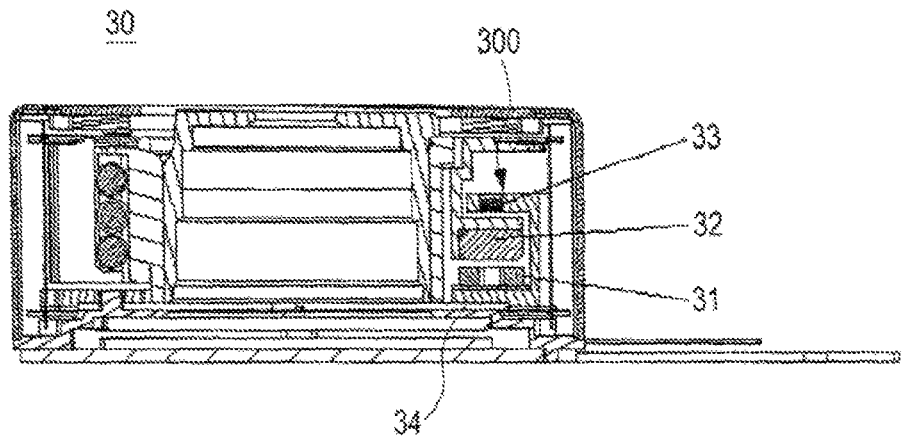
FIG. 8 is a longitudinally sectional view illustrating a structure of a driving device according to a second embodiment of the present invention.

FIG. 8 is a longitudinally sectional view illustrating a structure of a driving device 30 according to a second embodiment of the present invention. In the description of the driving device 30 according to the second embodiment of the present invention shown in FIG. 8, with an AF driving unit and first and second OIS driving units which constitute the driving device 30, the AF driving unit has an identical structure to that of the AF driving unit shown in FIG. 2, and the first and second OIS driving units have an identical structure except that elements of the driving units are disposed differently from those shown in FIG. 2. Accordingly, since the first and second OIS driving units are symmetrically disposed in the first and second corner regions, the description of the second OIS driving unit will be omitted in order to avoid duplicating a description, and only the structure of the first OIS driving unit 300 will be described.

The first OIS driving unit is disposed in the first corner region in a direction perpendicular to the optical axis. That is, the first and second OIS driving units shown in FIGS. 1 to 7 are disposed in parallel with the optical axis. In other words, the first and second OIS driving units are mounted to be upright along the optical axis in the first and second corner regions. However, the first OIS driving unit 300 according to the second embodiment of the present invention is disposed in a direction perpendicular to the optical axis. Particularly, the first OIS driving unit 300 includes an OIS base 34, a first OIS coil 31 disposed on the OIS base 34 in the first corner region, and a first OIS magnet 32 disposed on the first OIS coil 31 in the first corner region. In addition, although it is not shown in the drawings, the second OIS driving unit includes a second OIS coil disposed on the OIS base in the second corner region, and a second OIS magnet disposed on the second OIS coil in the second corner region.

Further, the first OIS coil 31 and the first OIS magnet 32 are arranged in parallel with a plane perpendicular to the optical axis while facing to each other, and the second OIS coil and the second OIS magnet also are arranged in parallel with a plane perpendicular to the optical axis while facing to each other. The first OIS driving unit 300 includes a first OIS positioning sensor 33 disposed on the first OIS magnet 32. The second OIS driving unit includes a second OIS positioning sensor disposed on the second OIS magnet.

In this case, the first OIS magnet 32 is integrally connected to the OIS carrier, and the first OIS positioning sensor 33 is disposed on the OIS base. The second OIS magnet is integrally connected to the OIS carrier, and the second OIS is disposed on the OIS base.

In result, the first OIS coil 31, the first OIS magnet 32 and the first OIS positioning sensor 33 are stacked up in a direction of the optical axis in the first corner region, and are disposed in parallel with one another while facing to one another. Further, the second OIS coil, the second OIS magnet and the second OIS positioning sensor are stacked up in a direction of the optical axis in the second corner region, and are disposed in parallel with one another while facing to one another.

On the other hand, in the driving device 30, the first OIS coil and the first OIS magnet may be changed with each other in an arrangement position.

Figure 9:
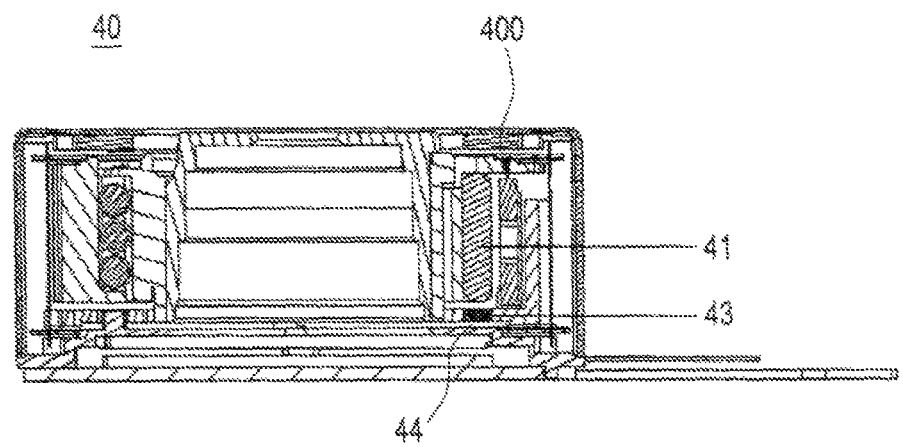
FIG. 9 is a longitudinally sectional view illustrating a structure of a driving device according to a third embodiment of the present invention.

FIG. 9 is a longitudinally sectional view illustrating a structure of a driving device 40 according to a third embodiment of the present invention. In the description of a driving device 40 according to the third embodiment of the present invention shown in FIG. 9, an AF driving unit constituting the driving unit 40 has an identical structure to that of the AF driving unit (shown in FIG. 2) in the first and second OIS driving units. With the coil, the magnet and the positioning sensor constituting the first and second OIS driving units, the arrangement of the magnet and the coil is identical to that of the first embodiment, and the arrangement of only the positioning sensor is different from that in the first embodiment. Therefore, only the first positioning sensor 43 of the first and second OIS positioning sensors of the first and second OIS driving units (disposed in the first corner region) will be described in order to avoid duplicating a description, and the description of the second OIS positioning sensor (disposed in the second corner region) will be omitted because the second OIS positioning sensor is symmetrically disposed against the first positioning sensor 43. The first positioning sensor 43 is disposed on the OIS base 44 in the first corner region. Furthermore, the first positioning sensor 43 faces to a bottom surface of the first OIS magnet 41. The second positioning sensor also is disposed on the OIS base in the second corner region. In addition, the second positioning sensor faces to a bottom surface of the second OIS magnet.

As a result, in the driving device 40 according to the third embodiment of the present invention, the OIS positioning sensor may be disposed on the OIS base 44, particularly to face to a bottom surface of the OIS magnet 41. The OIS base may be made of an injection molding product or a metal plate. In a case of making the OIS base of the metal plate, first and second upright portions of the OIS base are made by a bending operation.

Figure 10A:
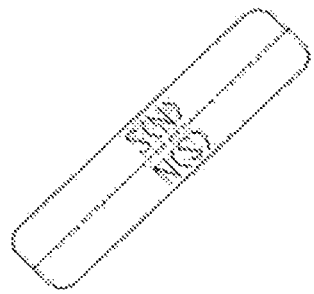
FIG. 10A is a view illustrating a magnetized structure of first and second OIS magnets according to the first embodiment of the present invention.
Figure 10A:
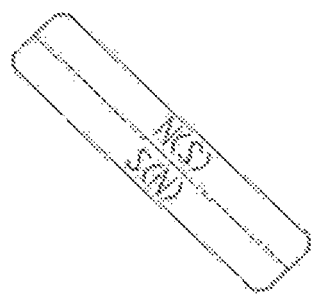
Figure 10B:
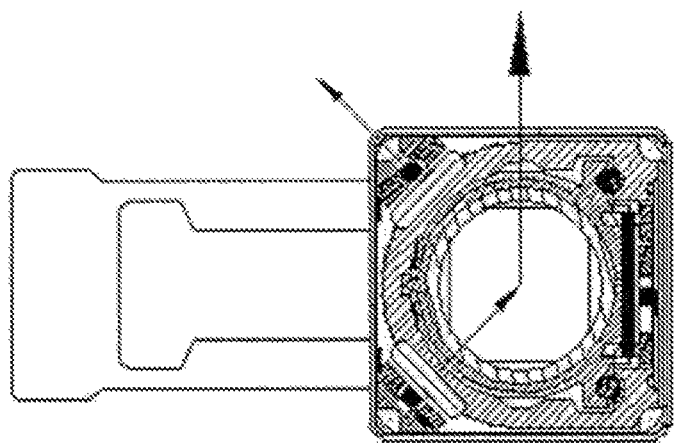
FIGS. 10B and 10C are views illustrating directions of force applied to the camera lens module according to the magnetized structure of the first and second OIS magnets.
Figure 10C:
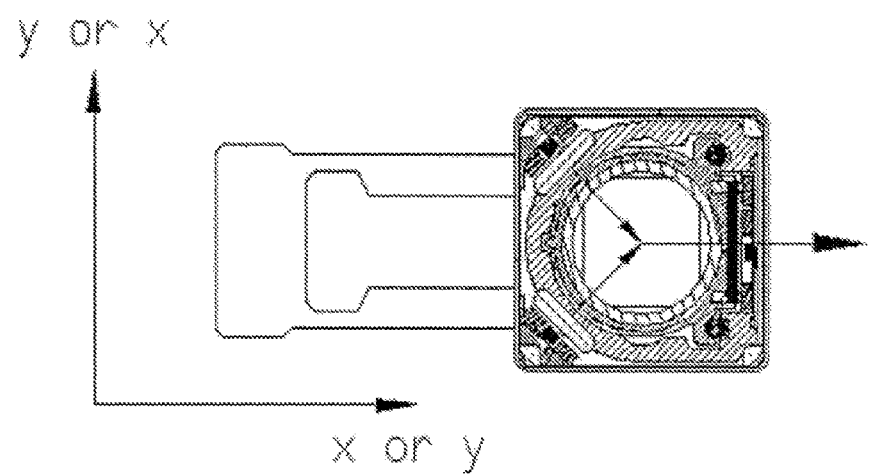

FIG. 10A is a view illustrating a magnetized structure of the first and second OIS magnets according to the first embodiment of the present invention, and FIGS. 10B and 10C are views illustrating directions of forces applied to the camera lens module according to the magnetized structure of the first and second OIS magnets, respectively. Referring to FIGS. 10A to 10C, when the first and second OIS magnets of the first OIS driving unit are magnetized and driven, force is provided to the OIS carrier in a direction of X or Y so as to compensate for a hand shaking of the OIS carrier. Arrows denote the direction of the force.

Figure 11A:
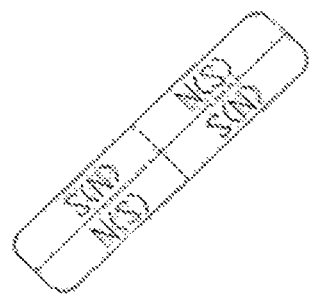
FIG. 11A is a view illustrating the magnetized structure of the first and second OIS magnets according to the first embodiment of the present invention.
Figure 11A:
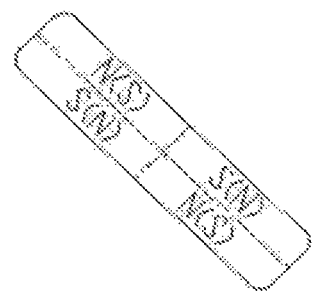
Figure 11B:
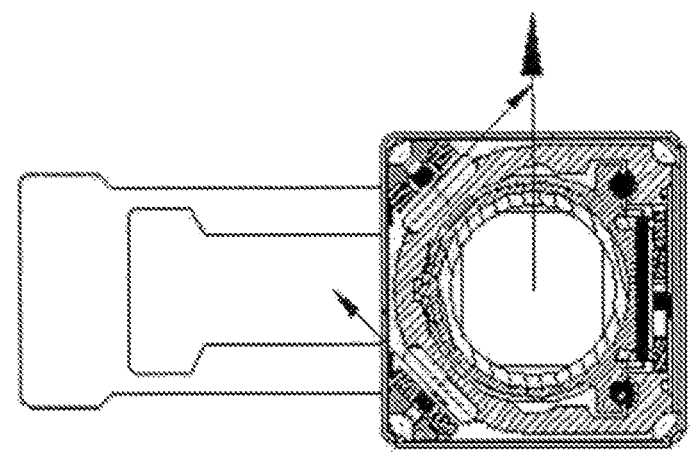
FIGS. 11B and 11C are views illustrating directions of force applied to the camera lens module according to the magnetized structure of the first and second OIS magnets.
Figure 11C:
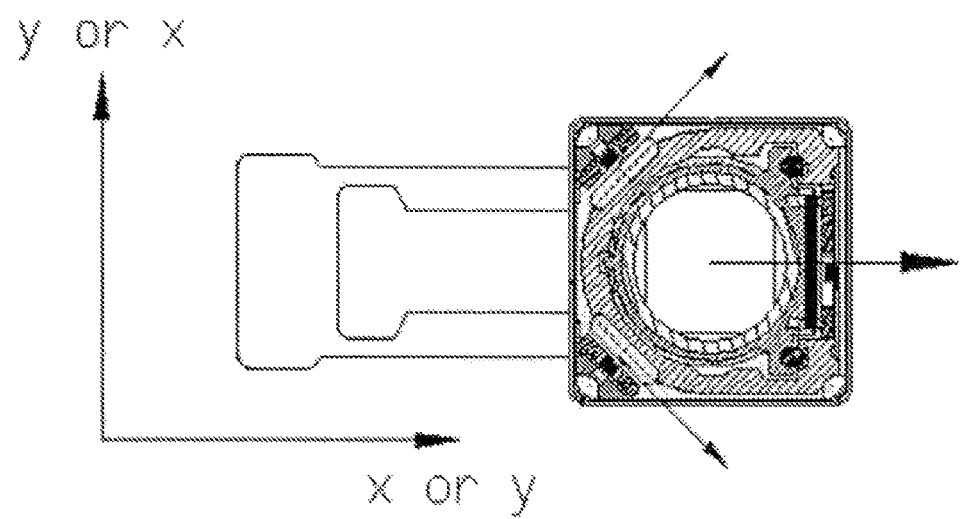

FIG. 11A is a view illustrating a magnetized structure of the first and second OIS magnets according to the first embodiment of the present invention, and FIGS. 11B and 11C are views illustrating the directions of forces applied to the camera lens module according to the magnetized structure of the first and second OIS magnets, respectively. Referring to FIGS. 11A to 11C, when the first and second OIS magnets of the first OIS driving unit are magnetized and driven, force is provided to the OIS carrier in a direction of X or Y so as to compensate for a hand shaking of the OIS carrier. Arrows denote the direction of the force.

The first and second OIS magnets shown in FIG. 10A have a structure in that they are magnetized in pair, and the first and second OIS magnets shown in FIG. 11A have a structure in that they are magnetized in two pairs.

As described above, according to the present invention, the first and second OIS driving units are disposed in an empty space of the camera lens module, thereby miniaturizing the camera lens module and the device for driving the camera lens module of the portable terminal.

Further, according to the present invention, by disposing first and second OIS drivers at empty space of a camera lens module and by disposing two flexible printed circuit boards of a thin film at each of an upper end portion and a lower end portion, respectively, of an OIS carrier, and by connecting them using a wire at a corner, a driving device of a camera lens module of a portable terminal is formed in a small size and thus a camera lens module is formed in a small size.

According to the present invention, furthermore, the lens carrier is installed in the OIS carrier, on one surface of which an opening is formed, and the AF driving unit for providing a driving force to the lens carrier is disposed in the opening of the OIS carrier, so that the lens carrier independently performs an AF operation regardless of the OIS carrier. That is, in the present invention, since the OIS carrier has a structure of partially enclosing the AF driving unit, it is possible to provide the miniaturized camera lens module. Further, since a driving force of the AF driving unit is applied to only the lens carrier, the OIS carrier and the AF driving unit can be operated by a minimum driving force.

Although the present invention is shown and described with reference to the specific embodiments, it will be understood by a person skilled in the art that the details and forms of the present invention may be modified in various forms without departing from the spirit and the scope of the present invention as defined by the attached claims and the equivalents thereof.

What is claimed is:

1. A camera lens module of a portable terminal, comprising:
   an external case;
   an Optical Image Stabilizer (OIS) carrier disposed within the external case; and
   at least one pair of OIS drivers disposed in at least one pair of corner regions of the external case to correct a hand shaking state of the OIS carrier,
   wherein the at least one pair of OIS drivers comprises first and second OIS drivers which are respectively disposed at opposing first and second corner regions of the external case, and
   wherein the first OIS driver and the second OIS driver are each disposed to be upright in an optical axis direction.

2. The camera lens module of claim 1, wherein the first OIS driver comprises:
   a first OIS magnet mounted at an outer circumferential surface of the OIS carrier and disposed to face the first corner region; and
   a first OIS coil disposed at the first corner region and disposed to face in a state separated from the first OIS magnet, and
   the second OIS driver comprises:
   a second OIS magnet mounted at another outer circumferential surface of the OIS carrier and disposed to face the second corner region; and
   a second OIS coil disposed at the second corner region and disposed to face in a state separated from the second OIS magnet.

3. The camera lens module of claim 2, wherein the OIS carrier is supported by an OIS base positioned at the bottom.

4. The camera lens module of claim 3, wherein in the OIS base, first and second upright portions are provided at two corners, respectively to be housed in the first and second corner regions, respectively, and
   the first and second upright portions support the first and second OIS coils, respectively.

5. The camera lens module of claim 4, wherein a first position sensor is disposed at the OIS base bottom of the first corner region, and
   a second position sensor is disposed at the OIS base bottom of the second corner region.

6. The camera lens module of claim 4, wherein a first position sensor is disposed in the first upright portion, and
   a second position sensor is disposed in the second upright portion.

7. The camera lens module of claim 6, wherein the first position sensor is disposed toward the inside or a rear surface of the first OIS coil in the first corner region, and
   the second position sensor is disposed toward the inside or a rear surface of the second OIS coil in the second corner region.

8. A camera lens module of a portable terminal, comprising:
   an external case;
   a lens carrier guided along an optical axis within the external case;
   an Automatic Focusing (AF) driver disposed between one surface of the external case and one side of the lens carrier facing the one surface to move the lens carrier along the optical axis;
   an Optical Image Stabilizer (OIS) carrier that houses the lens carrier; and
   first and second OIS drivers perpendicularly disposed in an optical axis direction in first and second corner regions of the opposite side of one surface in which the AF driver is disposed.

9. The camera lens module of claim 8, wherein the AF driver is disposed between one surface of the external case and one side of the lens carrier opposite each other and comprising:
   an AF magnet mounted at a one side surface of the lens carrier in parallel to one surface of the external case;
   an AF coil disposed to face the AF magnet at one surface of the external case;
   an AF position sensor disposed at an opening within the AF coil;
   an AF driving integrated circuit (IC) disposed beside the coil; and
   an AF yoke disposed to face the AF coil to support the AF coil.

10. The camera lens module of claim 9, wherein the AF driver further comprises an AF flexible printed circuit board disposed in parallel to an upper end portion of the OIS carrier, and
    the first and second OIS drivers further comprise an OIS flexible printed circuit board disposed in parallel to the AF flexible printed circuit board at a bottom surface of the OIS base.

11. The camera lens module of claim 10, wherein the AF and OIS flexible printed circuit boards are electrically connected and supported by at least one suspension wire,
    each suspension wire thereof is perpendicularly disposed along an optical axis in a corner region of each of the OIS carriers, and upper end portions of the each suspension wire are each fixed and connected to the AF flexible printed circuit board, and lower end portions thereof are each fixed and connected to the OIS flexible printed circuit board.

12. The camera lens module of claim 11, wherein the AF flexible printed circuit board has a closed-loop shape and has a shape continuously extended along an upper end portion of the OIS carrier and further comprising:
    a first central opening; and
    an AF auxiliary flexible printed circuit board bent orthogonal downward to be disposed to face the AF magnet,
    wherein the OIS flexible printed circuit board has a closed-loop shape and has a shape continuously extended along a lower end portion of the OIS carrier and further comprising:
    a second central opening; and
    first and second AF auxiliary flexible printed circuit boards each bent orthogonal upward to face the first and second OIS magnets, respectively.

13. A camera lens module of a portable terminal, comprising:
    an external case;
    a lens carrier guided along an optical axis within the external case;
    an Automatic Focusing (AF) driver disposed between one surface of the external case and one side of the lens carrier facing the one surface to move the lens carrier along the optical axis;
    an Optical Image Stabilizer (OIS) carrier that houses the lens carrier; and
    OIS drivers disposed in at least two corner regions, respectively of the opposite side of the one surface among corner regions provided in the external case and each mounted in parallel to a vertical direction plane of the optical axis in the respective corner regions.

14. The camera lens module of claim 13, wherein the OIS carrier is supported by an OIS base positioned at the bottom.

15. The camera lens module of claim 14, wherein the first OIS driver comprises:
    a first OIS coil disposed on the OIS base of a first corner region; and
    a first OIS magnet disposed on the first OIS coil in the first corner region and integrally connected to the OIS carrier,
    wherein the second OIS driver comprises:
    a second OIS coil disposed on the OIS base of a second corner region; and
    a second OIS magnet disposed on the second OIS coil in the second corner region and integrally connected to the OIS carrier.

16. The camera lens module of claim 15, wherein the first OIS coil and the first OIS magnet are each disposed in parallel to a vertical plane of the optical axis while facing each other, and the second OIS coil and the second OIS magnet are each disposed in parallel to a vertical plane of the optical axis while facing each other.

17. The camera lens module of claim 14, wherein the first OIS driver comprises a first OIS position sensor disposed in parallel on the first OIS magnet and provided in the OIS base, and the second OIS driver comprises a second OIS position sensor disposed in parallel on the second OIS magnet and provided in the OIS base.

\* \* \* \* \*